United States Patent
Col et al.

(10) Patent No.: US 9,588,769 B2
(45) Date of Patent: Mar. 7, 2017

(54) PROCESSOR THAT LEAPFROGS MOV INSTRUCTIONS

(71) Applicant: VIA TECHNOLOGIES, INC., New Taipei (TW)

(72) Inventors: Gerard M. Col, Austin, TX (US); Matthew Daniel Day, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 273 days.

(21) Appl. No.: 14/315,122

(22) Filed: Jun. 25, 2014

(65) Prior Publication Data

US 2015/0347140 A1    Dec. 3, 2015

Related U.S. Application Data

(60) Provisional application No. 62/003,206, filed on May 27, 2014.

(51) Int. Cl.
*G06F 9/30* (2006.01)
*G06F 9/38* (2006.01)

(52) U.S. Cl.
CPC ...... *G06F 9/30069* (2013.01); *G06F 9/30032* (2013.01); *G06F 9/384* (2013.01); *G06F 9/3855* (2013.01)

(58) Field of Classification Search
CPC ..... G06F 9/30032; G06F 9/384; G06F 9/3855
See application file for complete search history.

(56) References Cited

U.S. PATENT DOCUMENTS

| | | | |
|---|---|---|---|
| 5,790,826 A | 8/1998 | Thusoo et al. | |
| 6,094,716 A | 7/2000 | Witt | |
| 6,594,754 B1* | 7/2003 | Jourdan | G06F 9/30167 712/216 |
| 6,625,723 B1 | 9/2003 | Jourday et al. | |
| 7,222,226 B1 | 5/2007 | Lepak et al. | |
| 2002/0178346 A1 | 11/2002 | Elias et al. | |
| 2011/0264896 A1* | 10/2011 | Parks | G06F 9/30145 712/221 |

(Continued)

FOREIGN PATENT DOCUMENTS

CN    1877532 A    12/2006
CN    101689107 A    3/2010

*Primary Examiner* — Benjamin Geib
(74) *Attorney, Agent, or Firm* — E. Alan Davis; Eric W. Cernyar; James W. Huffman

(57) ABSTRACT

A processor performs out-of-order execution of a first instruction and a second instruction after the first instruction in program order, the first instruction includes source and destination indicators, the source indicator specifies a source of data, the destination indicator specifies a destination of the data, the first instruction instructs the processor to move the data from the source to the destination, the second instruction specifies a source indicator that specifies a source of data. A rename unit updates the second instruction source indicator with the first instruction source indicator if there are no intervening instructions that write to the source or to the destination of the first instruction and the second instruction source indicator matches the first instruction destination indicator.

20 Claims, 5 Drawing Sheets

(56) References Cited

U.S. PATENT DOCUMENTS

2013/0275720 A1* 10/2013 Keller .................... G06F 9/384
    712/205
2014/0068230 A1   3/2014 Madduri et al.
2014/0281413 A1* 9/2014 Wang ................ G06F 9/30098
    712/217

* cited by examiner

PROCESSOR THAT LEAPFROGS MOV INSTRUCTIONS

CROSS REFERENCE TO RELATED APPLICATION(S)

This application claims priority based on U.S. Provisional Application, Ser. No. 62/003,206, filed May 27, 2014, entitled PROCESSOR THAT LEAPFROGS MOV INSTRUCTIONS, which is hereby incorporated by reference in its entirety.

BRIEF SUMMARY

In one aspect the present invention provides a processor configured to perform out-of-order execution of a first instruction and a second instruction that is after the first instruction in program order, wherein the first instruction includes a source indicator and a destination indicator, wherein the source indicator specifies a source of data, wherein the destination indicator specifies a destination of the data, wherein the first instruction instructs the processor to move the data from the source to the destination, wherein the second instruction specifies a source indicator that specifies a source of data. The processor includes a rename unit configured to compare the source indicator of the second instruction with the destination indicator of the first instruction. The rename unit is also configured to determine whether, in program order, there are any instructions between the first and second instructions that write to the source or to the destination of the first instruction. The rename unit is also configured to update the source indicator of the second instruction with the source indicator of the first instruction if there are no instructions between the first and second instructions that write to the source or to the destination of the first instruction and the source indicator of the second instruction matches the destination indicator of the first instruction.

In another aspect, the present invention provides a method, for use by a processor, for facilitating out-of-order execution of a first instruction and a second instruction that is after the first instruction in program order, wherein the first instruction includes a source indicator and a destination indicator, wherein the source indicator specifies a source of data, wherein the destination indicator specifies a destination of the data, wherein the first instruction instructs the processor to move the data from the source to the destination, wherein the second instruction specifies a source indicator that specifies a source of data. The method includes comparing the source indicator of the second instruction with the destination indicator of the first instruction, determining whether, in program order, there are any instructions between the first and second instructions that write to the source or to the destination of the first instruction, and updating the source indicator of the second instruction with the source indicator of the first instruction if there are no instructions between the first and second instructions that write to the source or to the destination of the first instruction and the source indicator of the second instruction matches the destination indicator of the first instruction.

In yet another aspect, the present invention provides a computer program product encoded in at least one non-transitory computer usable medium for use with a computing device, the computer program product comprising computer usable program code embodied in said medium for specifying a configured to perform out-of-order execution of a first instruction and a second instruction that is after the first instruction in program order, wherein the first instruction includes a source indicator and a destination indicator, wherein the source indicator specifies a source of data, wherein the destination indicator specifies a destination of the data, wherein the first instruction instructs the processor to move the data from the source to the destination, wherein the second instruction specifies a source indicator that specifies a source of data. The computer usable program code includes first program code for specifying a rename unit. The rename unit is configured to compare the source indicator of the second instruction with the destination indicator of the first instruction. The rename unit is also configured to determine whether, in program order, there are any instructions between the first and second instructions that write to the source or to the destination of the first instruction. The rename unit is also configured to update the source indicator of the second instruction with the source indicator of the first instruction if there are no instructions between the first and second instructions that write to the source or to the destination of the first instruction and the source indicator of the second instruction matches the destination indicator of the first instruction.

DETAILED DESCRIPTION OF THE EMBODIMENTS

Figure 1:
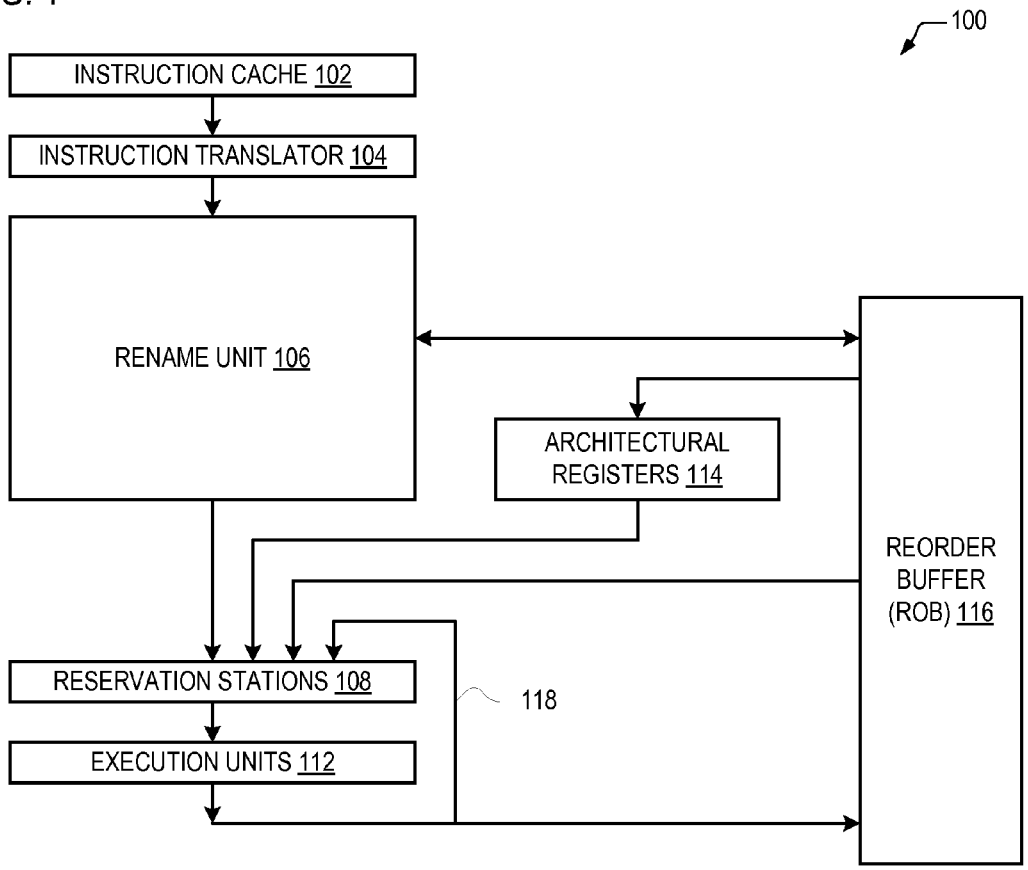
FIG. 1 is a block diagram illustrating a microprocessor.

Referring now to FIG. 1, a block diagram illustrating a microprocessor 100 is shown. The microprocessor 100 includes an instruction cache 102, an instruction translator 104, a rename unit 106, reservation stations 108, execution units 112, architectural registers 114, a reorder buffer 116 and a result forwarding bus 118. Other functional units (not shown) may include a microcode unit; branch predictors; a memory subsystem including a cache memory hierarchy (e.g., level-1 data cache, level 2 cache), memory order buffer, and memory management unit; data prefetch units; and a bus interface unit, among others. The microprocessor 100 has an out-of-order execution microarchitecture in that instructions may be issued for execution out of program order. More specifically, microinstructions, into which architectural instructions are translated, may be issued for execution out of program order. The program order of the microinstructions is the same as the program order of the respective architectural instructions from which they were translated. The microprocessor 100 also has a superscalar microarchitecture in that it is capable of issuing multiple instructions per clock cycle to the execution units 112 for execution. In one embodiment, the microprocessor 100 conforms substantially to the x86 instruction set architecture.

The instruction cache 102 caches architectural instructions fetched from system memory. The instruction translator 104 translates the architectural instructions fetched from the instruction cache 102 into microinstructions of a microinstruction set of the microarchitecture of the microprocessor 100. (See FIG. 2 for an example of a microinstruction 200.) The execution units 112 execute the microinstructions. The microinstructions into which an architectural instruction is translated implement the architectural instruction.

The rename unit 106 receives the translated microinstructions in program order. The ROB 116 is a circular queue, each entry of which includes storage for storing information associated with a microinstruction, such as a flag to indicate whether its result is valid and whether the entry (i.e., microinstruction itself) is valid. The rename unit 106 allocates an entry in the ROB 116 in program order for each microinstruction and updates the microinstruction with the index of the allocated ROB entry (in the DEST ROBIDX 208 of FIG. 2). The allocated ROB 116 entry has associated storage (result field) for storing the result of the microinstruction. When the microinstruction is retired, its result from the ROB entry is written to the architectural register 114 specified as the destination of the microinstruction.

The rename unit 106 dispatches each microinstruction to the appropriate reservation station 108 associated with the execution unit 112 that will execute the microinstruction. When the execution unit 112 is available and all the source operands of the microinstruction are available, the reservation station 108 issues the microinstruction to the execution unit 112 for execution. The execution unit 112 receives the source operands from either the architectural registers 114, the ROB 116 or the forwarding bus 118, depending upon the status of the writer microinstructions that generated the source operands. More specifically, if the source operand-producing (or writer) microinstruction has retired, the architectural register 114 will be the source; otherwise, the ROB 116 will be the source, unless the result is available on the forwarding bus 118 in the clock cycle it is needed.

The rename unit 106 performs register renaming and dependency generation for the microinstructions. In the typical case (e.g., in the non-MOV leapfrogging case), for each source operand of an instant microinstruction, the rename unit 106 determines the index of the entry in the ROB 116 allocated to "the newest older writer," which is the newest microinstruction in program order that is older in program order than the instant microinstruction and that writes to the architectural register that provides the source operand (specified by the SRC field 212 of FIG. 2). The rename unit 106 then updates the instant microinstruction (in the SRC ROBIDX field 216 of FIG. 2) with the ROB index of the newest older writer, i.e., with the DEST ROBIDX 208 of the newest older writer.

The reservation station 108 compares the SRC ROBIDX field 216 value of the waiting microinstruction with the ROB index of each result generated by the execution units 112 to determine whether the source operand is available. As may be observed from the description above, this creates a dependency of the waiting microinstruction on its newest older writers such that the waiting microinstruction cannot be issued for execution until all of the newest older writers have generated their results. This is generally detrimental to performance because it may cause one or more of the execution units 112 to be idle during a given clock cycle because it does not have a valid microinstruction to execute. This is referred to as underutilization. Generally speaking, the utilization of a microprocessor 100 is a function of the instruction level parallelism of the program being executed, which refers to the amount of instruction independence of the program's instruction stream, which dictates the microprocessor's ability to issue multiple microinstructions for execution per clock cycle (preferably one to each execution unit 112). The performance of a microprocessor 100 is determined in part by the ability of its microarchitecture to exploit the instruction level parallelism of the program.

Advantageously, a mechanism is described herein that increases the ability of the microprocessor 100 to exploit the instruction level parallelism of some instruction streams that include MOV microinstructions and thereby improve the performance of the microprocessor 100 through increased utilization. A MOV microinstruction instructs the processor 100 to move a single source operand from a source to a destination register specified by the DEST field 204. The source operand is specified by a combination of the SRC 212, IMMEDIATE 222, SRC ROBIDX 216 and/or SRC ROBSEL 218 fields and the SRC SIZE field 214 specifies its size, each of which is described with respect to FIG. 2. The mechanism—referred to herein as MOV leapfrogging—enables a microinstruction to be issued for execution sooner than would otherwise be possible according to the typical case described above.

Consider the following code sequence in which microinstruction (1) is oldest in program order and microinstruction (3) is newest in program order.

(1) ADD AX, AX, CX; add AX to CX and place the result in AX (2) MOV BX, AX; copy AX to BX (3) SUB DX, DX, BX; subtract BX from DX and place the result in DX In this case, the microprocessor 100 may cause the MOV microinstruction to be leapfrogged by the SUB microinstruction. In the example, the SUB microinstruction is referred to as the target microinstruction. In particular, the rename unit 106 makes the target microinstruction (the SUB microinstruction) dependent upon the result of the newest older writer of the source of the leapfrog-able MOV microinstruction—which is the ADD microinstruction—rather than upon the result of the MOV microinstruction. More specifically, the rename unit 106 copies the source of the MOV microinstruction to the source of the target microinstruction (e.g., as described with respect to blocks 418 and 422 of FIG. 4). This provides the advantage that in some cases the target microinstruction (SUB) may be able to be issued for execution to an execution unit 112 sooner than it would if it were dependent upon the result of the MOV microinstruction.

Figure 3:
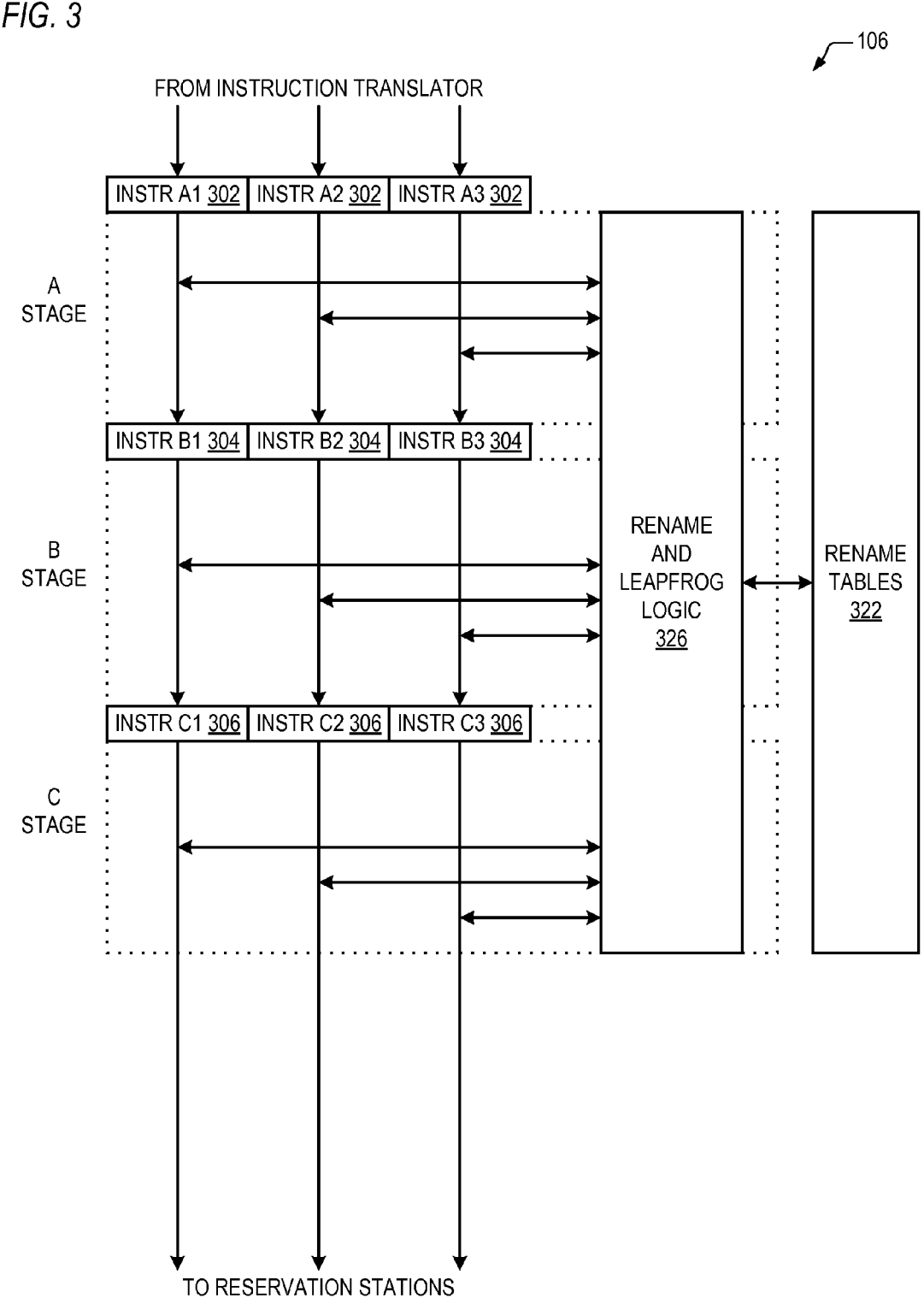
FIG. 3 is a block diagram illustrating in more detail an embodiment of the rename unit of FIG. 1.

In one embodiment, the rename unit 106 receives up to three microinstructions per clock cycle, and the rename unit 106 is a pipelined unit of three pipeline stages (see FIG. 3). Thus, in one embodiment, during some clock cycles the rename unit 106 has visibility of up to nine microinstructions of the instruction stream to determine whether it includes a leapfrog-able MOV microinstruction and a target microinstruction that may leapfrog the MOV microinstruction. In one embodiment, the rename unit 106 can leapfrog at most five MOV microinstructions in a given clock cycle. Other embodiments are contemplated in which the number of microinstructions received per clock cycle and the number of pipeline stages is different and therefore the number of microinstructions in the window of opportunity of the rename unit 106 to perform MOV leapfrogging. Generally, a microinstruction is potentially a leapfrog target, or simply target, if it follows a MOV microinstruction in program order and specifies the destination of the MOV microinstruction as its source. Whether the potential target may leapfrog the MOV microinstruction (i.e., is updated to enable the target microinstruction to be dispatched to its execution unit 112 for execution simultaneously with or even before the MOV microinstruction, i.e., to execute out-of-order with respect to the MOV microinstruction) is described below with respect to FIG. 4.

In one embodiment, the rename unit 106 includes a leapfrog-able MOV queue (LMQ) 524 (see FIGS. 5-8), which may increase the window of opportunity of the rename unit 106 to perform MOV leapfrogging. The LMQ 524 holds information about potentially leapfrog-able MOV microinstructions that have passed out of the rename unit 106. This enables the rename unit 106 to encounter a target microinstruction after a MOV microinstruction has passed out of the rename unit 106 and to cause the target microinstruction to leapfrog the leapfrog-able MOV microinstruction whose information is stored in the LMQ 524. Broadly speaking, the window of opportunity for MOV leapfrogging is potentially increased by the presence of the LMQ 524 at the expense of additional complexity, chip real estate and power consumption.

Some microinstructions specify immediate data as a source operand, i.e., an immediate operand. The rename unit 106 provides immediate data on an immediate bus to the reservation stations 108. Advantageously, embodiments are described in which MOV leapfrogging may be performed when the source operand of the MOV microinstruction is an immediate operand, as described in more detail below.

In one embodiment, the target microinstruction can itself be a MOV microinstruction. For example, in the following code sequence, the MOV BX, AX microinstruction may be leapfrogged by the MOV DX, BX microinstruction. That is, the rename unit 106 may make the MOV DX, BX microinstruction (target microinstruction) dependent upon the result of the ADD microinstruction (newest older writer) rather than upon the result of the MOV BX, AX microinstruction.

Figure 2:
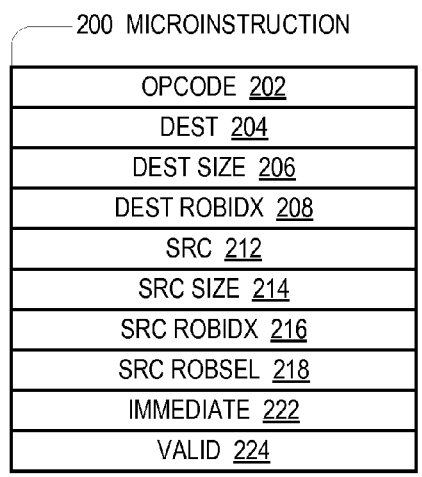
FIG. 2 is a block diagram illustrating fields of a microinstruction.

(1) ADD AX, AX, CX; add AX to CX and place the result in AX
(2) MOV BX, AX; copy AX to BX
(3) MOV DX, BX; copy BX to DX Referring now to FIG. 2, a block diagram illustrating fields of a microinstruction 200 is shown. The microinstruction 200 includes an opcode field 202 that specifies an operation code of the microinstruction 200. The opcode 202 is an encoded value that specifies an operation to be performed by the execution units 112 in response to the microinstruction 200. For example, one opcode 202 value instructs the execution units 112 to move data from a source to a destination, denoted herein as a MOV instruction, or MOV microinstruction 200; another opcode 202 value instructs the execution units 112 to add two source operands to generate a sum (ADD); another opcode 202 value instructs the execution units 112 to subtract two source operands to generate a difference (SUB). The microinstruction set of the microarchitecture of the microprocessor 100 includes many other opcode values that instruct the execution units 112 to perform an operation on a source operand.

The microinstruction 200 also includes a DEST field 204 that specifies a destination of the result generated by the microinstruction 200. Typically, the instruction translator 104 populates the DEST 204 to specify the architectural register 114 specified as the destination register by the architectural instruction from which the microinstruction 200 was translated. However, depending upon the set of implementing microinstructions 200 into which the instruction translator 104 translates the architectural instruction, the instruction translator 104 may populate the DEST 204 to specify a temporary (i.e., non-architectural) register of the microprocessor 100. The microinstruction 200 also includes a DEST SIZE field 206 that specifies the size of the result to be written to the destination register. The microinstruction 200 also includes a DEST ROBIDX field 208 that specifies the index into the ROB 116 of the ROB entry allocated to the microinstruction 200. The execution unit 112 that executes the microinstruction 200 writes its result to the result field of the ROB entry indexed by the value in the DEST ROBIDX field 208.

The microinstruction 200 also includes a SRC field 212 that specifies a source of data, or source operand. In one embodiment, the SRC field 212 is 9 bits. Preferably, the upper 4 bits of the SRC 212 specify a source type. In one embodiment, the source type may indicate the source of the data is: (1) an architectural register 114 (or temporary register) identified by the lower 5 bits of the SRC 212; (2) an immediate operand in an IMMEDIATE field 222 (described below) of the microinstruction 200 itself; or (3) an immediate operand (e.g., a constant) encoded in the lower 5 bits of the SRC field 212. In one embodiment, the immediate operand in the IMMEDIATE field 222 is an x86-type immediate value, although other embodiments are contemplated that accommodate other instruction set architectures. As described herein, the rename unit 106 provides the immediate operand to the reservation stations 108 via the immediate bus. In case (1), the instruction translator 104 populates the SRC 212 to specify an architectural register 114 specified as a source register by the architectural instruction from which the microinstruction 200 was translated. However, depending upon the set of implementing microinstructions 200 into which the instruction translator 104 translates the architectural instruction, the instruction translator 104 may populate the SRC 212 to specify a temporary (i.e., non-architectural) register of the microprocessor 100. Advantageously the rename unit 106 may update the SRC 212 to specify a different architectural register 114 (or temporary register) to accomplish MOV leapfrogging, as described herein.

The microinstruction 200 also includes a SRC SIZE field 214 that specifies the size of the source operand. The microinstruction 200 also includes a SRC ROBIDX field 216 that specifies the index into the ROB 116 of the entry allocated to a microinstruction 200 that provides the source operand to the instant microinstruction 200 in the case of a non-immediate source operand. That is, the SRC ROBIDX 216 identifies the microinstruction 200 whose result is the non-immediate source data for the instant microinstruction 200, which may be provided either via the forwarding bus 118 or via the ROB 116 entry specified by the SRC ROBIDX 216 (if the result-providing microinstruction 200 has not yet retired; otherwise, the source operand would be provided by an architectural register 114 or temporary register). As described above, typically the rename unit 106 populates the SRC ROBIDX 216 to identify the newest older writer of the architectural register 114 specified by the SRC 212 of the instant microinstruction 200 as populated by the instruction translator 104. However, when possible, the rename unit 106 advantageously populates the SRC ROBIDX 216 to identify the microinstruction 200 that is the newest older writer of the architectural register 114 specified by the SRC 212 of an older MOV microinstruction 200 to cause the instant microinstruction 200 to leapfrog the MOV microinstruction 200, as described with respect to FIG. 4, for example.

The microinstruction 200 also includes a SRC ROBSEL bit 218 that is effectively a valid bit for the SRC ROBIDX dependency 216. That is, if the SRC ROBSEL bit 218 is set, then the source operand is provided by the forwarding bus 118 or the ROB 116, more specifically by the ROB 116 entry identified by the SRC ROBIDX 216; whereas, if the SRC ROBSEL bit 218 is clear, then the source operand is provided by the architectural register file 114 specified by the SRC field 212 in the case of a register operand, or by the immediate bus in the case of an immediate operand. As described below (see block 422 of FIG. 4, for example), when MOV leapfrogging is possible, the rename unit 106 copies to the SRC ROBSEL 218 of the instant microinstruction 200 (i.e., the target microinstruction 200), the SRC ROBSEL 218 of the MOV microinstruction 200 being leapfrogged.

The microinstruction 200 also includes an IMMEDIATE field 222 that holds an immediate source operand value if the microinstruction 200 includes one, which is indicated by the SRC field 212, as described above. Finally, the microinstruction 200 includes a valid bit 224 that indicates whether or not the microinstruction 200 is valid.

It should be understood that the microinstruction 200 fields shown in FIG. 2 are representative of many microinstructions of the microinstruction set of the processor 100, particularly a MOV microinstruction 200 that may be leapfrogged and target microinstructions 200 that leapfrog a MOV microinstruction 200 according the embodiments described herein; however, other microinstructions may exist in the microinstruction set of the processor 100 that have other field arrangements than shown in FIG. 2, some of which may leapfrog a MOV microinstruction 200. For example, in some cases the microinstruction 200 also includes a second set of fields (not shown) similar to the fields 212-218 for a second source operand (e.g., a two source operand ADD or SUB microinstruction), whose use is described below with respect to FIG. 4. Furthermore, the microinstructions may include other fields not shown in FIG. 2.

Referring now to FIG. 3, a block diagram illustrating in more detail an embodiment of the rename unit 106 of FIG. 1 is shown. The rename unit 106 of the embodiment of FIG. 3 includes three pipeline stages, denoted stage A, stage B and stage C, separated by staging registers. In one embodiment, the rename unit 106 receives from the instruction translator 104 up to three microinstruction 200 per clock cycle, which are denoted INSTR A1, INSTR A2 and INSTR A3 and which are received into pipeline staging registers 302. The microinstructions 200 pass through stage A to staging registers 304 where they are denoted INSTR B1, INSTR B2 and INSTR B3. The microinstructions 200 pass through stage B to staging registers 306 where they are denoted INSTR C1, INSTR C2 and INSTR C3. The microinstructions 200 pass through stage C to the reservation stations 108.

The rename unit 106 also includes rename logic and leapfrog logic 326 and rename tables 322 coupled to the rename and leapfrog logic 326. As the microinstructions 200 pass through the stages they are processed by the rename and leapfrog logic 326. Thus, according to the embodiment of FIG. 3, a stream of up to nine microinstructions 200 (in program order, starting with INSTR C1 and ending with INSTR A3) are visible to and may be processed by the rename and leapfrog logic 326 during a given clock cycle. More specifically, the leapfrog logic 326 has visibility of up to nine microinstructions for the purpose of identifying microinstruction 200 sequences that present opportunities to perform MOV leapfrogging. Other embodiments are contemplated in which more or fewer microinstructions are processed per clock cycle.

As the rename logic 326 processes the microinstructions 200, it maintains the rename tables 322 in order to perform register renaming and to generate the appropriate dependencies for each microinstruction 200. Additionally, as the leapfrog logic 326 processes the microinstructions 200, it updates target microinstructions 200 to perform MOV leapfrogging as described in more detail below.

Figure 4:
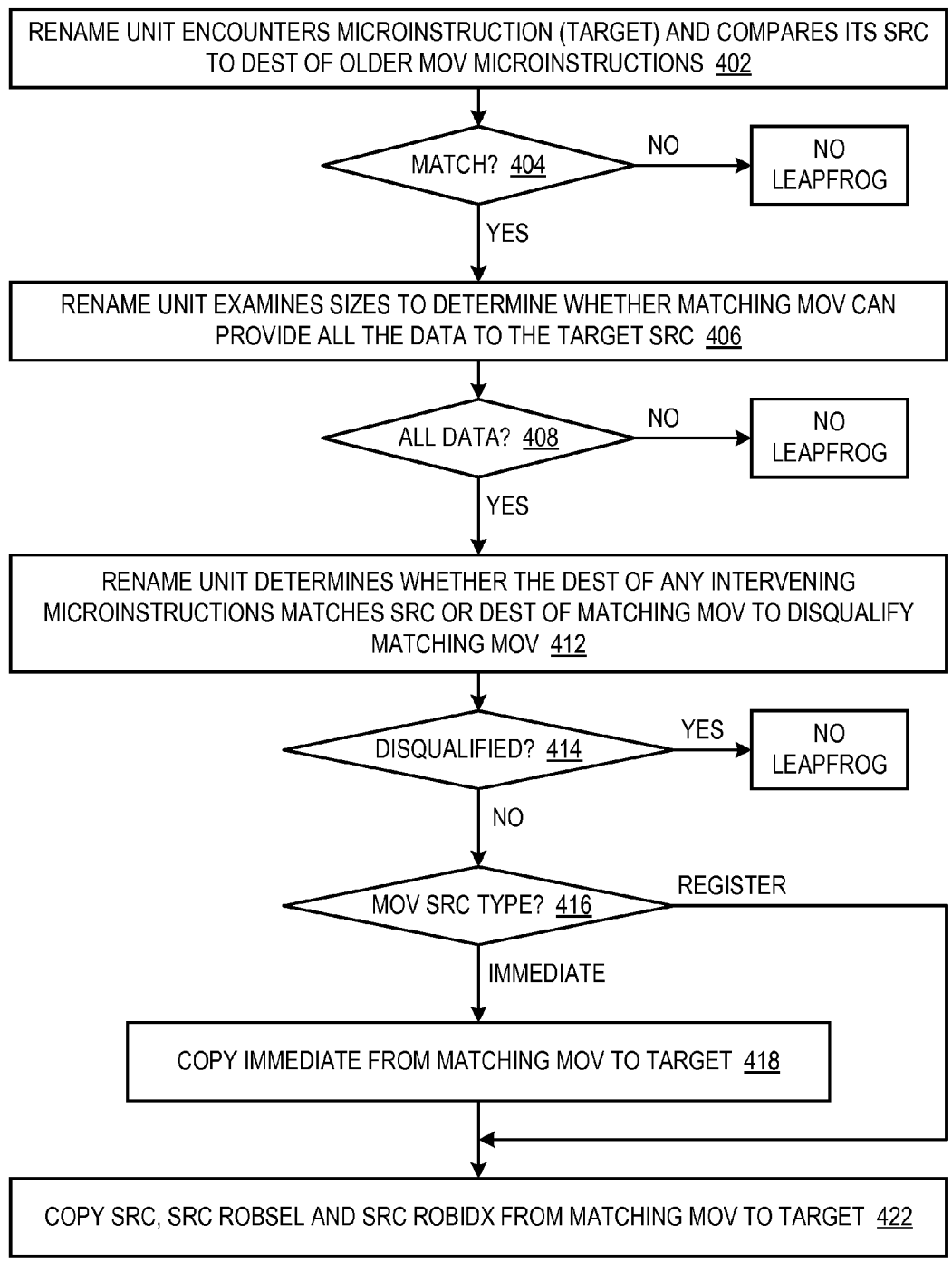
FIG. 4 is a flowchart illustrating operation of the rename unit of FIG. 1.

Referring now to FIG. 4, a flowchart illustrating operation of the rename unit 106 of FIG. 1 is shown. Flow begins at block 402.

At block 402, the rename unit 106 encounters a microinstruction 200 (target microinstruction 200) and compares its SRC field 212 with the DEST field 204 of each older MOV microinstruction 200 visible to the rename unit 106 to determine whether the target microinstruction 200 is a candidate for leapfrogging a MOV microinstruction 200. In the embodiment of FIG. 3, the older MOV microinstructions 200 are those within the rename unit 106 pipeline. In the alternate embodiment described with respect to FIGS. 5-8, the rename unit 106 also compares the microinstruction 200 SRC field 212 with the DEST field 204 of each valid entry of the LMQ 524 to determine whether the target microinstruction 200 is a candidate for leapfrogging a MOV microinstruction 200 that has already passed out of the rename unit 106. For an embodiment in which the target microinstruction 200 has two sources, both of the sources are compared. Flow proceeds to decision block 404.

At decision block 404, if the compare at block 402 yields a match, the rename unit 106 designates the matching MOV microinstruction 200 as the newest matching older MOV microinstruction 200 (since there may be multiple matches), and flow proceeds to block 406 since the target has been identified as having potential for MOV leapfrogging; otherwise, flow ends, i.e., the target microinstruction 200 is not a candidate for MOV leapfrogging.

At block 406, the rename unit 106 examines the DEST SIZE 206 of the matching MOV microinstruction 200 and the SRC SIZE 214 of the target microinstruction 200 to verify that the matching MOV microinstruction 200 can provide all of the data specified by the source of the target microinstruction 200. In other words, the size of the target source may be smaller than the size of the matching MOV (and may be different than the default operand size for the current operating mode, e.g., x86 long mode, protected mode, real mode), as long as the matching MOV can provide all of the data specified by the target. Flow proceeds to decision block 408.

At decision block 408, if the rename unit 106 determines the matching MOV can provide all the data to the target, flow proceeds to block 412; otherwise, flow ends, i.e., the target microinstruction 200 is not a candidate for MOV leapfrogging.

At block 412, the rename unit 106 determines whether the DEST 204 of any microinstructions 200 intervening between the matching MOV and the target match the SRC 212 or DEST 204 of the matching MOV, which would disqualify the matching MOV from being leapfrogged by the target.

Consider the following code sequence.
(1) MOV AX, BX; copy BX to AX
(2) LOAD AX, [ESP]; load operand at memory address in ESP into AX (3) SUB CX, AX; subtract AX from CX and place the result in CX In this case, the source of the SUB microinstruction matches the destination of the older MOV microinstruction and the matching MOV can provide all the data to the target SUB microinstruction (in this case, because their sizes are the same). However, the MOV is disqualified from being leapfrogged by the target because the destination of the MOV is overwritten by the intervening LOAD microinstruction.

Consider also the following code sequence.
(1) MOV AX, BX; copy BX to AX
(2) AND BX, DX; Boolean AND BX and DX and place result in BX
(3) SUB CX, AX; subtract AX from CX and place the result in CX In this case, the matching MOV microinstruction is also disqualified from being leapfrogged by the target SUB microinstruction because the source of the MOV microinstruction is overwritten by the intervening AND microinstruction. The matching MOV must be disqualified in this case because the intervening AND microinstruction could retire and update the architectural BX register 114 before the target SUB microinstruction was ready to receive its source operand from the architectural BX register 114, in which case the SUB would receive the incorrect value. That is, the SUB should have received the result of the newest writer to BX older than the MOV; however, that result would have been clobbered by the retirement of the AND microinstruction.

In one embodiment, a MOV microinstruction 200 that specifies an immediate source operand is also disqualified from being leapfrogged if the target microinstruction 200 already specifies an immediate source operand (in addition to a second register source operand) because the rename unit 106 includes a single immediate operand bus; however, other embodiments are contemplated in which the rename unit 106 includes a second immediate operand bus, in which case the restriction does not apply. Flow proceeds from block 412 to decision block 414.

At decision block 414, if the rename unit 106 determines the matching MOV is not disqualified per block 412, flow proceeds to decision block 416; otherwise, flow ends, i.e., the target microinstruction 200 is not a candidate for MOV leapfrogging.

At decision block 416, the rename unit 106 determines the source type from the SRC 212 of the matching MOV. If the source type indicates an immediate source operand provided in the IMMEDIATE field 222 of the MOV microinstruction 200, flow proceeds to block 418; otherwise, if the source type indicates a register source operand or an encoded immediate source operand in the SRC field 212, flow proceeds to block 422.

At block 418, the rename unit 106 copies the IMMEDIATE field 222 value of the MOV microinstruction 200 to the IMMEDIATE field 222 of the target microinstruction 200. Flow proceeds to block 422.

At block 422, the rename unit 106 copies the values of the SRC 212, SRC ROBIDX 216 and SRC ROBSEL 218 of the matching MOV to the corresponding fields of the target microinstruction 200. This (along with the copy of the IMMEDIATE 222 at block 418 if necessary) accomplishes the target leapfrogging the matching MOV since the target no longer needs to wait for the MOV to complete (i.e., to generate its result) before being issued for execution. In the case of an immediate operand, the copying of the SRC ROBSEL 218 operates to clear the SRC ROBSEL 218 in the target microinstruction 200 since the SRC ROBSEL 218 of the leapfrogged MOV microinstruction 200 will be clear. In the case of an encoded immediate source operand source type, the encoded immediate source operand will be copied from the MOV to the target by virtue of the copying of the SRC 212. Flow ends at block 422.

Figure 5:
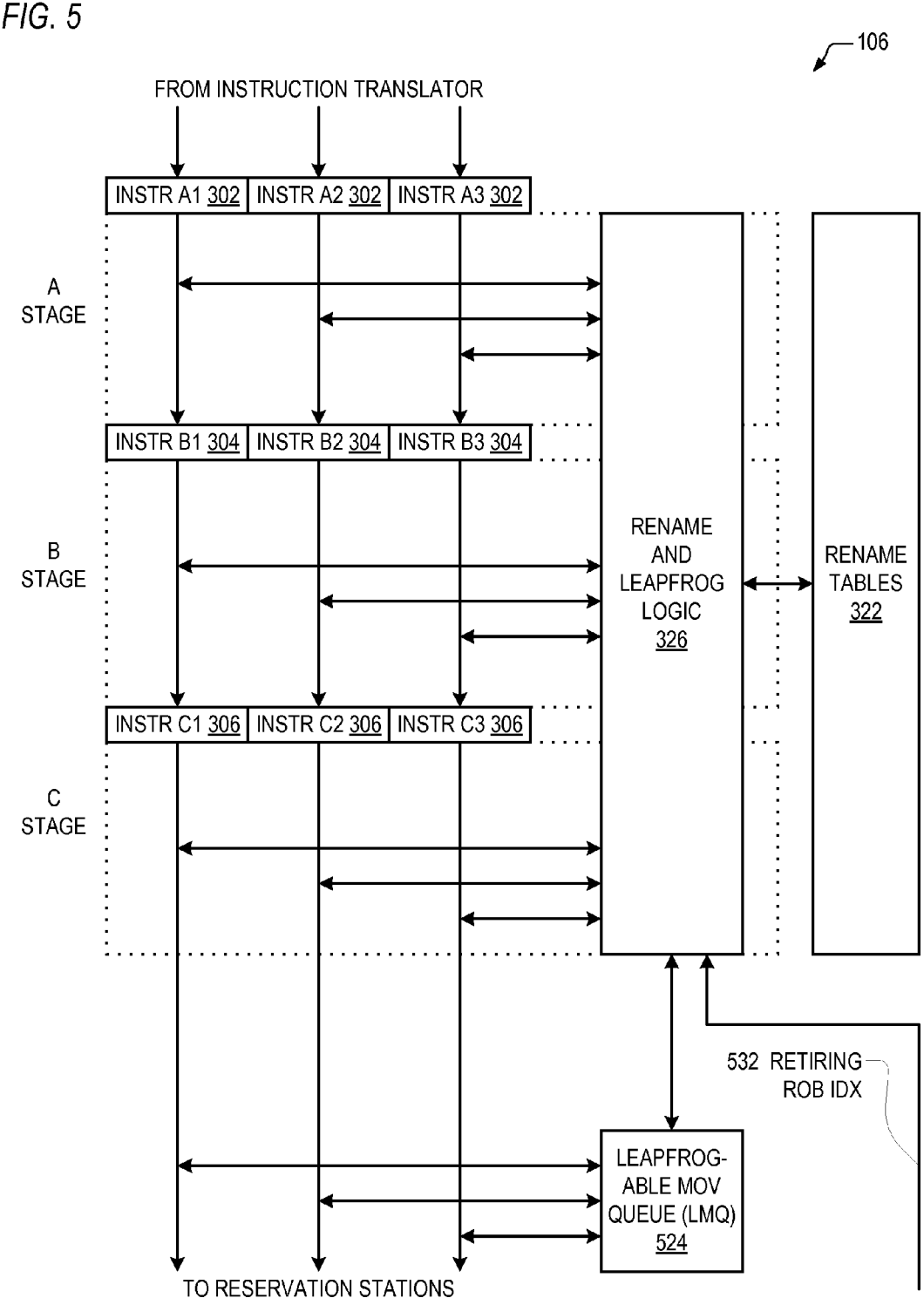
FIG. 5 is a block diagram illustrating in more detail an alternate embodiment of the rename unit of FIG. 1.

Referring now to FIG. 5, a block diagram illustrating in more detail an alternate embodiment of the rename unit 106 of FIG. 1 is shown. The rename unit 106 of FIG. 5 is similar to the rename unit 106 of FIG. 3, and like-numbered elements are similar. The embodiment of FIG. 5 also includes a leapfrog-able MOV queue (LMQ) 524 coupled to the rename and leapfrog logic 326. The rename and leapfrog logic 326 also receives a retiring ROB index signal 532 from the ROB 116 that specifies the ROB 116 index of a MOV microinstruction 200 that is about to retire, which is used as described below with respect to FIG. 6. Finally, as the leapfrog logic 326 processes microinstructions 200, it updates the LMQ 524 as described in more detail below (e.g., with respect to FIGS. 6-8). Preferably, each entry of the LMQ 524 includes the fields of a MOV microinstruction 200 as shown in FIG. 2, except the OPCODE field 202 is preferably not included since it is known the information stored in the LMQ 524 entry is associated with a MOV microinstruction 200. The LMQ 524 holds information about MOV microinstructions that have passed out of the rename unit 106 and may enable the rename unit 106 to cause a target microinstruction to leapfrog a MOV microinstruction that has already passed out of the rename unit 106. The LMQ 524 may increase the window of opportunity for MOV leapfrogging in exchange for additional complexity, chip real estate and power consumption.

Figure 6:
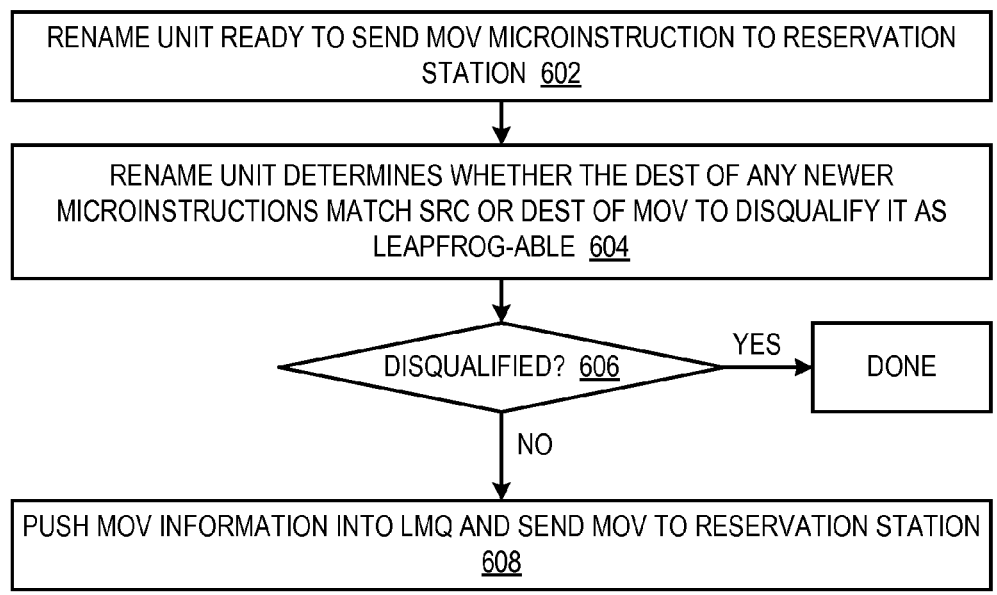
FIG. 6 is a flowchart illustrating operation of the rename unit of FIG. 5.

Referring now to FIG. 6, a flowchart illustrating operation of the rename unit 106 of FIG. 5 is shown. Flow begins at block 602.

At block 602, the rename unit 106 has processed a MOV microinstruction 200 and is ready to send it out of the rename unit 106 to a reservation station 108. Flow proceeds to block 604.

At block 604, the rename unit 106 determines whether the DEST 204 of any microinstructions 200 newer than the MOV microinstruction 200 match the SRC 212 or DEST 204 of the MOV microinstruction 200, which will disqualify the MOV microinstruction 200 from being leapfrogged by any subsequent microinstructions 200, i.e., by any microinstructions 200 that are subsequently processed by the leapfrog logic 326. That is, the leapfrog logic 326 determines whether there are any microinstructions within its view newer in program order than the MOV microinstruction 200 that write to the source or destination of the MOV microinstruction 200. Flow proceeds to decision block 606.

At decision block 606, if the MOV microinstruction 200 is disqualified, flow ends. In other words, an entry in the LMQ 524 need not be wasted since it is known that it is not leapfrog-able by microinstructions 200 newer than those already processed by the leapfrog logic 326 at the time the MOV microinstruction 200 is exiting the rename unit 106. If the MOV microinstruction 200 is not disqualified, flow proceeds to block 608.

At block 608, the rename unit 106 sends the MOV microinstruction 200 to a reservation station 108 and pushes information about the MOV microinstruction 200 into the LMQ 524. In one embodiment, each entry of the LMQ 524 includes the same fields as the microinstruction 200 of FIG. 2. In one embodiment, the LMQ 524 entry does not include the OPCODE 202, which is unnecessary because it is already known that the information is associated with a MOV microinstruction 200. It should be understood that even if the valid MOV microinstruction 200 is not pushed into the LMQ 524, it may have been leapfrogged by one or more target microinstructions while it was still in the rename unit 106 as described with respect to FIG. 4. The fact that the MOV microinstruction 200 was not pushed into the LMQ 524 merely indicates that it is not leapfrog-able by microinstructions 200 newer than those already processed by the leapfrog logic 326 at the time the MOV microinstruction 200 is exiting the rename unit 106. Flow ends at block 608.

Figure 7:
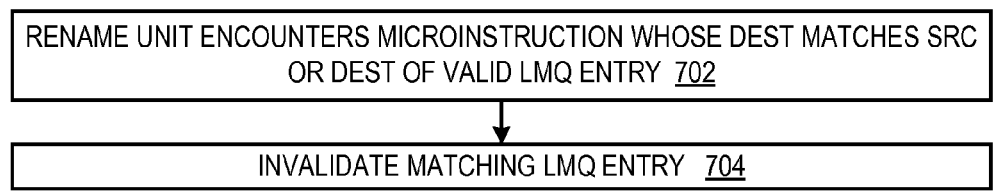
FIG. 7 is a flowchart illustrating operation of the rename unit of FIG. 5.

Referring now to FIG. 7, a flowchart illustrating operation of the rename unit 106 of FIG. 5 is shown. Flow begins at block 702.

At block 702, the rename unit 106 encounters a microinstruction 200 whose DEST field 204 matches with the SRC field 212 or the DEST field 204 of one or more valid entries in the LMQ 524. Flow proceeds to block 704.

At block 704, the rename unit 106 invalidates each matching entry found at block 702. Flow ends at block 704.

Figure 8:
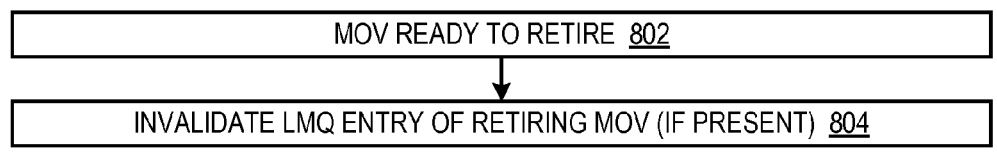
FIG. 8 is a flowchart illustrating operation of the rename unit of FIG. 5.

Referring now to FIG. 8, a flowchart illustrating operation of the rename unit 106 of FIG. 5 is shown. Flow begins at block 802.

At block 802, the rename unit 106 receives the ROB 116 index of a retiring MOV microinstruction 200 via signal 532. In one embodiment, the microprocessor 100 is capable of retiring up to three microinstructions per clock cycle, and the rename unit 106 is configured to receive the ROB 116 index of up to three retiring MOV microinstructions 200 via signal 532. Flow proceeds to block 804.

At block 804, the rename unit 106 compares the ROB 116 index received at block 802 with the DEST ROBIDX field 216 of each valid entry in the LMQ 524 to determine whether the LMQ 524 includes a valid entry for the retiring MOV microinstruction 200. If so, the rename unit 106 invalidates the matching entry. Flow ends at block 804.

Although embodiments have been described in which a full complement of MOV leapfrogging possibilities is performed, other embodiments are contemplated in which a subset of the MOV leapfrogging possibilities is performed. For example, embodiments are contemplated in which a MOV of an immediate value is not leapfrog-able. This embodiment may have the advantage of requiring less storage, namely of the immediate value, which is relatively large (e.g., 32 or 64 bits), for comparison (e.g., in the leapfrog-able MOV queue). Additionally, embodiments are contemplated without a leapfrog-able MOV queue in order to reduce space and complexity; rather, the MOV leapfrogging is performed while the potential leapfrog-able MOV and target are in the rename unit pipeline.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A method, for use by a processor, for facilitating out-of-order execution of a first instruction and a second instruction that is after the first instruction in program order, wherein the first instruction includes a source indicator and a destination indicator, wherein the source indicator specifies a source of data, wherein the destination indicator specifies a destination of the data, wherein the first instruction instructs the processor to move the data from the source to the destination, wherein the second instruction specifies a source indicator that specifies a source of data, the method comprising:
  comparing the source indicator of the second instruction with the destination indicator of the first instruction;
  determining whether, in program order, there are any instructions between the first and second instructions that write to the source or to the destination of the first instruction; and
  updating the source indicator of the second instruction with the source indicator of the first instruction when the source indicator of the second instruction matches the destination indicator of the first instruction, unless there is an instruction between the first and second instructions that write to the source or to the destination of the first instruction, in which case the rename unit is configured to refrain from updating the source indicator of the first instruction.

2. The method of claim 1, further comprising:
  determining that the first instruction source indicator indicates the source of the data is an immediate value included in the first instruction rather than an architectural register of the processor; and
  updating the second instruction to include the immediate value specified by the first instruction.

3. The method of claim 1, further comprising:
  wherein the first instruction includes a size indicator that specifies a size of the data to be moved to the destination specified by the destination indicator; and
  performing said updating even though the size of the data specified by the size indicator of the first instruction is smaller than a default operand size of a current operating mode of the processor.

4. The method of claim 3, further comprising:
  wherein the second instruction includes a size indicator that specifies a size of the data whose source is specified by the source indicator of the second instruction;
  determining whether the size of the data specified by the size indicator of the first instruction is at least as large as the size of the data specified by the size indicator of the second instruction; and performing said updating only if the size of the data specified by the size indicator of the first instruction is at least as large as the size of the data specified by the size indicator of the second instruction.

5. The method of claim 1, further comprising:
dispatching the first instruction for execution; and
dispatching the second instruction for execution before or simultaneously with said dispatching the first instruction for execution.

6. The method of claim 5, further comprising:
wherein each of the first and second instructions include a selector that indicates whether the source of the data should be an architectural register of the processor specified by its respective source indicator or an entry of the reorder buffer specified by its respective reorder buffer index; and
updating the selector of the second instruction with the selector of the first instruction if there are no instructions between the first and second instructions that write to the source or to the destination of the first instruction and the source indicator of the second instruction matches the destination indicator of the first instruction.

7. The method of claim 1, further comprising:
wherein the processor includes a reorder buffer, comprising an array of entries, wherein each entry of the array of entries is configured to receive a result of an executed instruction and has an associated index into the array;
wherein each of the first and second instructions include a source reorder buffer index;
initially causing a source reorder buffer index of each of the first and second instructions to specify an index into the reorder buffer array of an instruction that is the most recent writer of the respective source of the data specified by the respective source indicator; and
updating the source reorder buffer index of the second instruction with the source reorder buffer index of the first instruction if there are no instructions between the first and second instructions that write to the source or to the destination of the first instruction and the source indicator of the second instruction matches the destination indicator of the first instruction.

8. A computer program product encoded in at least one non-transitory computer usable medium for use with a computing device, the computer program product comprising:
computer usable program code embodied in said medium, for specifying a configured to perform out-of-order execution of a first instruction and a second instruction that is after the first instruction in program order, wherein the first instruction includes a source indicator and a destination indicator, wherein the source indicator specifies a source of data, wherein the destination indicator specifies a destination of the data, wherein the first instruction instructs the processor to move the data from the source to the destination, wherein the second instruction specifies a source indicator that specifies a source of data, the computer usable program code comprising:
first program code for specifying a rename unit, wherein the rename unit is configured to:
compare the source indicator of the second instruction with the destination indicator of the first instruction;
determine whether, in program order, there are any instructions between the first and second instructions that write to the source or to the destination of the first instruction; and
update the source indicator of the second instruction with the source indicator of the first instruction when the source indicator of the second instruction matches the destination indicator of the first instruction, unless there is an instruction between the first and second instructions that write to the source or to the destination of the first instruction, in which case the rename unit is configured to refrain from updating the source indicator of the first instruction.

9. A processor configured to perform out-of-order execution of a first instruction and a second instruction that is after the first instruction in program order, wherein the first instruction includes a source indicator and a destination indicator, wherein the source indicator specifies a source of data, wherein the destination indicator specifies a destination of the data, wherein the first instruction instructs the processor to move the data from the source to the destination, wherein the second instruction specifies a source indicator that specifies a source of data, the processor comprising:
a rename unit, configured to:
compare the source indicator of the second instruction with the destination indicator of the first instruction;
determine whether, in program order, there are any instructions between the first and second instructions that write to the source or to the destination of the first instruction; and
update the source indicator of the second instruction with the source indicator of the first instruction when the source indicator of the second instruction matches the destination indicator of the first instruction, unless there is an instruction between the first and second instructions that write to the source or to the destination of the first instruction, in which case the rename unit is configured to refrain from updating the source indicator of the first instruction.

10. The processor of claim 9, wherein the rename unit is further configured to:
determine that the first instruction source indicator indicates the source of the data is an immediate value included in the first instruction rather than an architectural register of the processor; and
update the second instruction to include the immediate value specified by the first instruction.

11. The processor of claim 9, wherein the first instruction includes a size indicator that specifies a size of the data to be moved to the destination specified by the destination indicator, wherein the rename unit is further configured to perform the update even though the size of the data specified by the size indicator of the first instruction is smaller than a default operand size of a current operating mode of the processor.

12. The processor of claim 11, wherein the second instruction includes a size indicator that specifies a size of the data whose source is specified by the source indicator of the second instruction, wherein the rename unit is further configured to:
determine whether the size of the data specified by the size indicator of the first instruction is at least as large as the size of the data specified by the size indicator of the second instruction; and
perform the update only if the size of the data specified by the size indicator of the first instruction is at least as large as the size of the data specified by the size indicator of the second instruction.

13. The processor of claim 9, further comprising:
execution units, configured to execute the first and second instructions; and
wherein the processor is configured to dispatch the second instruction to one of the execution units before or simultaneously with dispatching the first instruction to one of the execution units.

14. The processor of claim 9, further comprising:
a queue of entries, wherein each entry of the entries of the queue is configured to hold information associated with a different instruction that instructs the processor to move data from a source to a destination, wherein the instruction includes a source indicator and a destination indicator, wherein the source indicator specifies the source of the data, wherein the destination indicator specifies the destination of the data; and
wherein the rename unit is configured to push the information into the queue and validate the entry into which the information is pushed.

15. The processor of claim 14, wherein an entry of the queue holds the destination indicator of the first instruction that is compared by the rename unit with the source indicator of the second instruction.

16. The processor of claim 15, wherein the compare is performed after the rename unit has finished processing the first instruction and pushed the information associated with the first instruction into the queue and while the rename unit is still processing the second instruction.

17. The processor of claim 14, wherein the rename unit is further configured to:
for each entry of the entries of the queue, invalidate the entry in response to encountering an instruction that writes to the source or to the destination of the instruction.

18. The processor of claim 14, wherein the rename unit is further configured to:
for each entry of the entries of the queue, invalidate the entry in response to receiving an indication that processor is retiring the instruction.

19. The processor of claim 9, further comprising:
a reorder buffer, comprising an array of entries, wherein each entry of the array of entries is configured to receive a result of an executed instruction and has an associated index into the array;
wherein each of the first and second instructions include a source reorder buffer index that the rename unit initially causes to specify an index into the reorder buffer array of an instruction that is the most recent writer of the respective source of the data specified by the respective source indicator; and
wherein the rename unit is further configured to update the source reorder buffer index of the second instruction with the source reorder buffer index of the first instruction if there are no instructions between the first and second instructions that write to the source or to the destination of the first instruction and the source indicator of the second instruction matches the destination indicator of the first instruction.

20. The processor of claim 19, further comprising:
wherein each of the first and second instructions include a selector that indicates whether the source of the data should be an architectural register of the processor specified by its respective source indicator or an entry of the reorder buffer specified by its respective reorder buffer index; and
wherein the rename unit is further configured to update the selector of the second instruction with the selector of the first instruction if there are no instructions between the first and second instructions that write to the source or to the destination of the first instruction and the source indicator of the second instruction matches the destination indicator of the first instruction.

* * * * *